United States Patent
He et al.

(10) Patent No.: US 8,178,075 B2
(45) Date of Patent: May 15, 2012

(54) TUBULAR REACTOR WITH JET IMPINGEMENT HEAT TRANSFER

(75) Inventors: Xiaoyi He, Orefield, PA (US); Robert Roger Broekhuis, Allentown, PA (US); Diwakar Garg, Emmaus, PA (US); Bo Jin, Allentown, PA (US); William Robert Licht, Allentown, PA (US); Stephen Clyde Tentarelli, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 746 days.

(21) Appl. No.: 12/190,806

(22) Filed: Aug. 13, 2008

(65) Prior Publication Data

US 2010/0038593 A1 Feb. 18, 2010

(51) Int. Cl.
*B01J 8/02* (2006.01)

(52) U.S. Cl. ........ 423/659; 423/650; 423/651; 423/652; 423/653; 423/654

(58) Field of Classification Search .......... 423/650–654, 423/659
See application file for complete search history.

(56) References Cited

U.S. PATENT DOCUMENTS

| | | | |
|---|---|---|---|
| 3,744,174 A * | 7/1973 | Lund | 43/42.06 |
| 4,340,501 A | 7/1982 | Davidson | |
| 4,719,090 A | 1/1988 | Masaki | |
| 5,350,566 A | 9/1994 | Stringaro | |
| 5,361,710 A * | 11/1994 | Gutmark et al. | 110/346 |
| 5,832,994 A * | 11/1998 | Nomura | 165/173 |
| 6,216,466 B1 * | 4/2001 | Alkabie | 60/746 |
| 6,859,472 B2 | 2/2005 | Betin et al. | |
| 7,025,339 B2 | 4/2006 | Meski et al. | |
| 7,056,083 B2 | 6/2006 | Gray | |
| 7,100,381 B2 | 9/2006 | Hale et al. | |
| 2005/0016170 A1 | 1/2005 | Pellizzari | |
| 2005/0097819 A1 * | 5/2005 | Lomax et al. | 48/127.9 |
| 2005/0112056 A1 | 5/2005 | Hampden-Smith et al. | |
| 2006/0008399 A1 | 1/2006 | Feinstein | |
| 2006/0245981 A1 | 11/2006 | Whittenberger et al. | |
| 2007/0025893 A1 | 2/2007 | Whittenberger et al. | |
| 2007/0227173 A1 | 10/2007 | Bezama et al. | |
| 2007/0297956 A1 | 12/2007 | Repasky et al. | |
| 2008/0145284 A1 | 6/2008 | Whittenberger et al. | |

FOREIGN PATENT DOCUMENTS

| | | |
|---|---|---|
| EP | 0 025 308 B1 | 7/1984 |
| GB | 2 353 738 A | 3/2001 |
| WO | 2006/058060 A | 6/2006 |
| WO | 2006058060 A2 | 6/2006 |
| WO | 2006/113196 A | 10/2006 |

\* cited by examiner

*Primary Examiner* — Paul Wartalowicz
(74) *Attorney, Agent, or Firm* — Bryan C. Hoke, Jr.

(57) ABSTRACT

A tubular reactor and method for producing a product mixture in a tubular reactor where the tubular reactor comprises an internal catalytic insert having orifices for forming fluid jets for impinging the fluid on the tube wall. Jet impingement is used to improve heat transfer between the fluid in the tube and the tube wall in a non-adiabatic reactor. The tubular reactor and method may be used for endothermic reactions such as steam methane reforming and for exothermic reactions such as methanation.

7 Claims, 8 Drawing Sheets

TUBULAR REACTOR WITH JET IMPINGEMENT HEAT TRANSFER

BACKGROUND

The present invention relates to a method and tubular reactors for producing a product mixture from a reactant mixture. More specifically, the present invention relates to improving heat transfer in tubular reactors.

Reactors containing packings with catalyst have been described, for example, tubular reactors used in steam methane reforming. The packings may be random packings such as catalyst pellets or so-called structured packing. Structured packing, as compared to random packings, can produce lower pressure drop, are not easily fluidized, and are not prone to settling or crushing. Since tubular reactors are often externally heated or cooled, another important characteristic of the reactor is related to heat transfer between the external heat source/sink and the process fluid within the reactor.

Tubular reactors may contain random packing or structured packing where the packing includes catalyst for the desired reaction. Structured packing has been credited with lower pressure drop compared to random packing.

Heat transfer in tubular reactors has been recognized as being important. Efforts relating to improving heat transfer in tubular reactors have been described.

Davidson, U.S. Pat. No. 4,340,501, describes a structure in a reactor vessel where the fluid is intermittently but controllably brought into contact with the vessel walls. As a result, Davidson states that it is possible to obtain the smooth-flow characteristics of honeycomb structures with the heat transfer characteristics of particulate beds.

In the invention according to Davidson, the process for contacting a fluid with the walls of a vessel is characterized by causing the fluid to flow alternatingly (a) through a structure within the vessel, and (b) through a space between the structure and the vessel walls. Davidson also describes an apparatus for carrying out the process comprising a vessel and a structure inside the vessel.

Repasky et al., U.S. Pat. Pub. No. 2007/0297956 discloses a method and a reactor made by a method for increasing heat transfer in a tubular reactor with a structured packing. The approach is to expand the structure toward the tubular reactor wall during construction, thereby reducing the gap between the wall and the packing. The fluid is squeezed between the packing and the tube wall. The reduced gap increases the velocity of the fluid and thereby increases heat transfer.

A problem with this approach and any approach where heat transfer relies on the gap between the structure and the tube wall, is that after extended operation at high temperature and pressure, the tube may experience time-dependent plastic deformation, commonly known as "creep," resulting in an increase in the tube diameter and a corresponding increase in the gap between the tube wall and the structured packing. Since the mechanism for heat transfer relies on the velocity of the fluid in this gap, and the velocity decreases as the gap is increased, the heat transfer decreases when the tube creeps. When heat transfer is reduced the reactor performance decreases.

It would be desirable to maintain heat transfer efficiency in a tubular reactor throughout the life of the tubular reactor especially when the tube creeps. The present invention solves the problem of heat transfer degradation resulting from tube creep in a tubular reactor.

BRIEF SUMMARY

The present invention relates to a method for producing a product mixture in a tubular reactor. The tubular reactor comprises a tube having a tube wall, and an insert situated within the tube. The tubular reactor has a tubular reactor inlet, and a tubular reactor outlet downstream of the tubular reactor inlet. The insert comprises a catalyst, and the insert has a plurality of orifices for forming fluid jets. The plurality of orifices are characterized by a hydraulic diameter, d, and a spacing, h, from the tube wall, wherein h/d for the plurality of orifices ranges from 0.5 to 10 or ranges from 1 to 10. The spacing, h, may range from 0.5 mm to 10 mm. The method comprises:

(a) introducing a reactant mixture comprising one or more reactants into the tubular reactor inlet with an inlet superficial axial velocity, $v_s$, and at a first pressure, $P_1$;

(b) contacting the one or more reactants from the reactant mixture with the catalyst on a first portion of the insert to react the one or more reactants under reaction conditions effective to form a first intermediate mixture comprising the one or more reactants and one or more products;

(c) forming a first plurality of fluid jets with at least a portion of the first intermediate mixture;

(d) impinging the first plurality of fluid jets on the tube wall thereby transferring heat between the tube and the first intermediate mixture from the first plurality of fluid jets;

(e) diverting at least a portion of the first intermediate mixture from the first plurality of fluid jets away from the tube wall thereby forming a return fluid comprising the one or more reactants and the one or more products;

(f) contacting the one or more reactants from the return fluid with the catalyst on a second portion of the insert to react the one or more reactants under reaction conditions effective to form a second intermediate mixture comprising the one or more reactants and the one or more products;

(g) forming a second plurality of fluid jets with at least a portion of the second intermediate mixture, the second plurality of fluid jets located downstream of the first plurality of fluid jets;

(h) impinging the second plurality of fluid jets on the tube wall thereby transferring heat between the tube and the second intermediate mixture;

(i) diverting at least a portion of the second intermediate mixture from the second plurality of fluid jets away from the tube wall; and (j) withdrawing the product mixture comprising the one or more products from the tubular reactor outlet at a second pressure, $P_2$;

wherein a cumulative pressure drop in the tubular reactor, $\Delta P_{jet}$, results from flow through the plurality of orifices; and wherein $$\frac{\Delta P_{jet}}{(P_1 - P_2)} \geq 0.5 \cdot \frac{\Delta P_{jet}}{(P_1 - P_2)}$$

may be greater than or equal to 0.75 or greater than or equal to 0.9.

The first plurality of fluid jets may have radial components of velocity ranging from $2 \times v_s$ to $25 \times v_s$ and the second plurality of fluid jets may have radial components of velocity ranging from $2 \times v_s$ to $25 \times v_s$.

The first plurality of fluid jets may have radial components of velocity ranging from $10 \times v_s$ to $25 \times v_s$ and the second plurality of fluid jets may have radial components of velocity ranging from $10 \times v_s$ to $25 \times v_s$.

The method may further comprise externally heating the tube wall such that the transferring of heat between the tube and the first intermediate gas mixture is from the tube to the first intermediate gas mixture.

The method may further comprise combusting a fuel external to the tube wall in a combustion reaction, and transferring heat from the combustion reaction to the tube wall such that the transferring of heat between the tube and the first intermediate mixture is from the tube to the first intermediate mixture.

The method may further comprise providing the tubular reactor.

The one or more reactants may comprise $CH_4$ and $H_2O$ and the one or more products may comprise $H_2$ and CO.

The catalyst used in the method may be a steam reforming catalyst.

The reaction conditions effective to form the first intermediate mixture may include a temperature ranging from 400° C. to 1000° C. and a pressure ranging from 100 kPa to 4200 kPa and the reaction conditions effective to form the second intermediate mixture may include a temperature ranging from 400° C. to 1000° C. and a pressure ranging from 100 kPa to 4200 kPa.

The method may further comprise externally cooling the tube wall such that the transferring of heat between the tube and the first intermediate gas mixture is from the first intermediate gas mixture to the tube.

The present invention also relates to a tubular reactor having a tubular reactor inlet and a tubular reactor outlet downstream of the tubular reactor inlet, where the tubular reactor comprises a tube having a tube wall, and an insert situated within the tube. The insert comprises a catalyst, and a plurality of metal structures consecutively arranged in a lengthwise direction of the tube, each of the plurality of metal structures having an upstream end, a downstream end and a side wall enclosing a central space between the upstream end and the downstream end, wherein the upstream end defines an inlet to the central space, wherein the central space is at least partially blocked at the downstream end, and wherein the side wall has a plurality of orifices suitable for forming jets of a fluid directed from the central space toward the tube wall, the plurality of orifices characterized by a hydraulic diameter, d, and a spacing, h, from the tube wall, wherein h/d for the plurality of orifices is in a range of 0.5 to 10, and wherein each of the plurality of metal structures define an outer space between the side wall of each of the plurality of metal structures and the tube wall, the outer space in fluid flow communication with the inlet of an adjacent downstream metal structure and/or the tubular reactor outlet.

The side wall of each of the plurality of metal structures may define a plurality of hollows in the outer space.

The central space may be blocked or closed at the downstream end.

The catalyst may be supported on the plurality of metal structures.

The catalyst may be supported by catalyst pellets.

The catalyst pellets may be located in the central space of each of the plurality of metal structures.

The insert may comprise a metal substructure situated within the central space of a metal structure of the plurality of metal structures wherein the catalyst is supported on the metal substructure.

The tube may be characterized by a cross-sectional area, $A_t$, and the outer space including the hollows for each of the plurality of metal structures may be characterized by a cross-sectional area, $A_a$, wherein $$0.1 \leq \frac{A_a}{A_t} \leq 0.7$$

at any position between the upstream end and the downstream end.

The plurality of orifices for each of the plurality of metal structures may have a cumulative flow area, $A_o$, wherein $$\frac{A_o}{A_t} < \frac{A_a}{A_t} \cdot \frac{A_o}{A_t}$$

may be less than or equal to 0.5.

The plurality of metal structures may comprise a baffle at the upstream end wherein the baffle circumscribes the inlet.

The baffle may be characterized by a gap defining a gap area, $A_b$, between the baffle and the tube wall wherein $$0.01 \leq \frac{A_b}{A_t} \leq \frac{A_o}{A_t}.$$

The downstream end of a first of the plurality of metal structures may be spaced a distance, D, from a second of the plurality of metal structures, wherein the second of the plurality of metal structures is adjacent and downstream of the first of the plurality of metal structures wherein 0.5 cm<D<50 cm.

The catalyst used in the tubular reactor may be a steam reforming catalyst.

The spacing, h, may range from 0.5 mm to 10 mm or may range from 1 mm to 10 mm.

The present invention also relates to a tubular reactor having a tubular reactor inlet and a tubular reactor outlet downstream of the tubular reactor inlet, where the tubular reactor comprises a tube having a tube wall and a longitudinal axis, and an insert situated within the tube. In this embodiment, the insert comprises a catalyst, and a metal structure defining a plurality of substantially parallel passages. The plurality of substantially parallel passages each have a longitudinal axis formed at an acute angle, α, to a virtual line parallel to the longitudinal axis of the tube, wherein α ranges from 10° to 80° or ranges from 30° to 60°. Each of the substantially parallel passages have an upstream end having a cross-sectional area, $A_{inlet}$, and a downstream end terminating in an orifice having a cross-sectional area, $A_{orifice}$, wherein $$\frac{A_{orifice}}{A_{inlet}}$$

for the plurality of substantially parallel passages ranges from 0.001 to 0.7 or ranges from 0.001 to 0.25. The orifice for each of the plurality of substantially parallel passages is characterized by a hydraulic diameter, d, and a spacing, h, from the tube wall, wherein h/d ranges from 0.5 to 10 or ranges from 1 to 10.

The spacing, h, for the orifice of each of the plurality of substantially parallel passages may range from 0.5 mm to 10 mm or may range from 1 mm to 10 mm.

In this embodiment, the metal structure may be formed from corrugated metal sheets and folded flat metal sheets.

The catalyst used in the tubular reactor may be a steam reforming catalyst.

$A_{orifice}$ may range from 0.1 mm² to 50 mm² or may range from 0.1 mm² to 20 mm².

The metal structure may support the catalyst.

DETAILED DESCRIPTION

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

The present invention relates to a method and tubular reactors for producing a product mixture from a reactant mixture. More specifically, the present invention relates to improving heat transfer in tubular reactors.

The method and tubular reactors may be particularly suited for the production of hydrogen and/or synthesis gas (syngas) where the product mixture may comprise $H_2$ and CO. The method and tubular reactors may also be used for other reaction process, such as water gas shift, partial oxidation, hydrogenation, the Haber process, methanation, desulfurization of gases, catalytic oxidation, and ammoxidation.

Tubular reactors are well-known in the chemical and petrochemical industries. Tubular reactors comprise a tube enclosing a catalyst on a support. The catalyst may supported on catalyst pellets or a so-called structured packing. Suitable catalysts for desired reactions are known in the art. For the case of hydrogen and/or synthesis gas production, the catalyst may be a steam reforming catalyst. Suitable catalysts for steam methane (hydrocarbon) reforming are known in the art. Any suitable catalyst may be selected and used in the method and/or reactor.

The present invention is concerned with non-adiabatic tubular reactors where heat may be supplied or removed from the tubular reactor through the tube wall.

Figure 1:
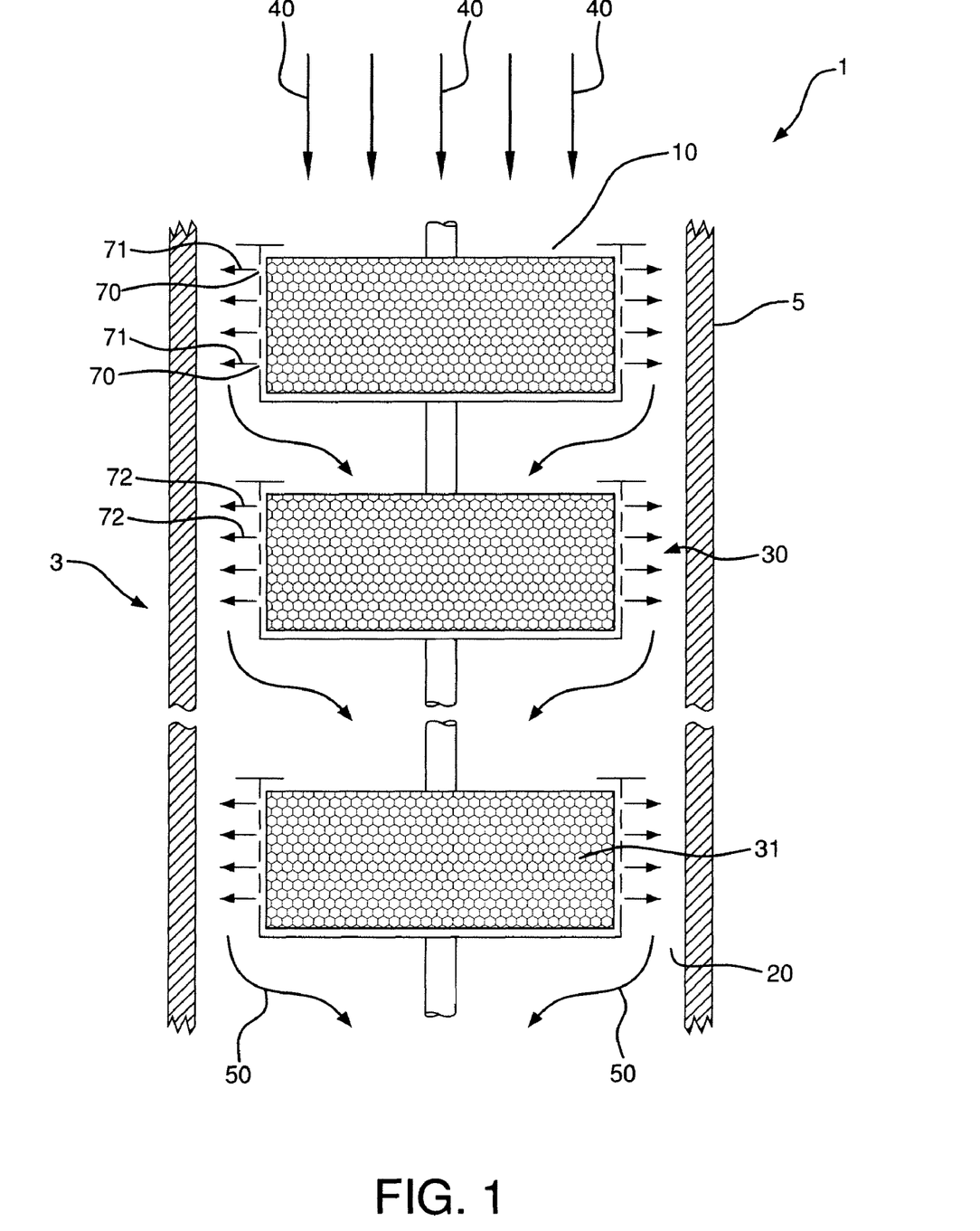
FIG. 1 is a general schematic of a tubular reactor illustrating jet impingement on the inner surface of the tube wall.

With reference to FIG. 1, a tubular reactor 1 is shown, the tubular reactor 1 comprising a tube 3 and an insert 30. The tube has a tube wall 5. The tubular reactor 1 has a tubular reactor inlet 10 and a tubular reactor outlet 20 downstream of the tubular reactor inlet 10. The insert 30 comprises a catalyst 31. The insert 30 is situated within the tube 3.

A tube is defined herein as any hollow body for conducting or conveying a fluid within the tube. The tube may have circular cross section, a square cross section or other desired shape. The tube has a longitudinal axis running lengthwise and positioned along the geometric centers of the cross sections of the tube. The lengthwise direction corresponds to the direction from the inlet to the outlet of the reactor.

Figure 2:
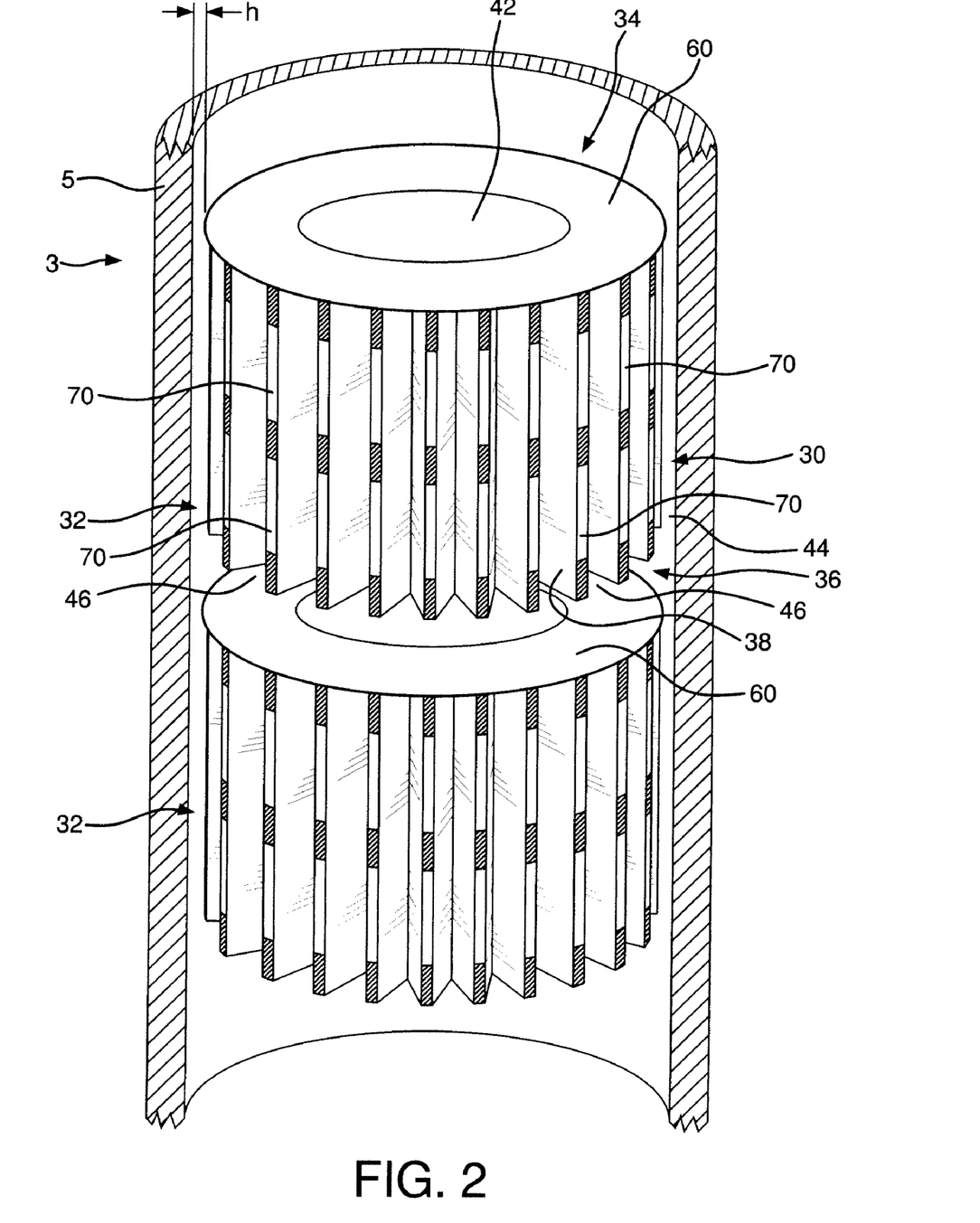
FIG. 2 is a schematic showing a portion of a tubular reactor with an insert for creating jet impingement on the tube wall.
Figure 3:
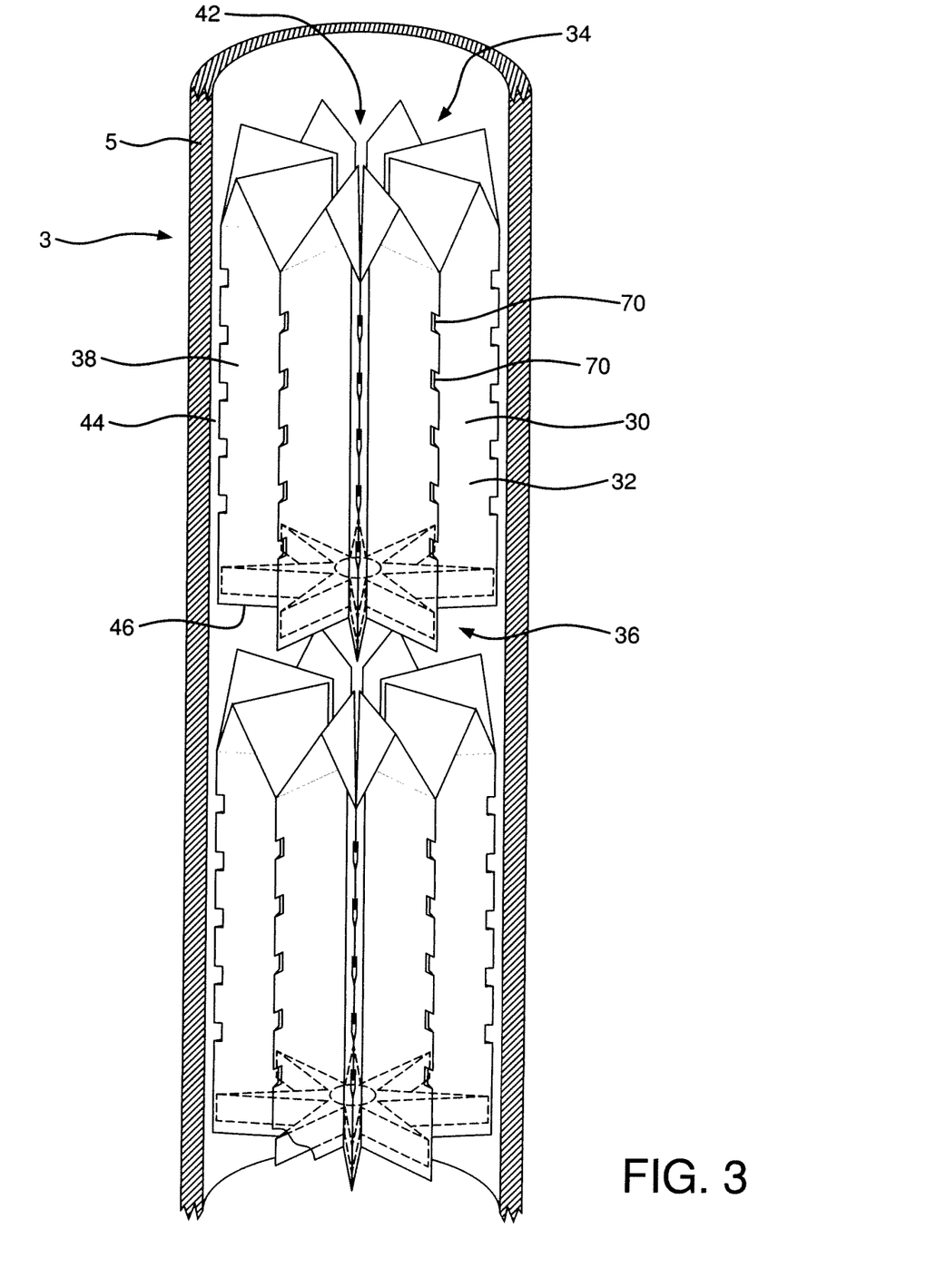
FIG. 3 is a schematic showing a portion of a tubular reactor with an insert with an alternative geometry for creating jet impingement on the tube wall.
Figure 4A:
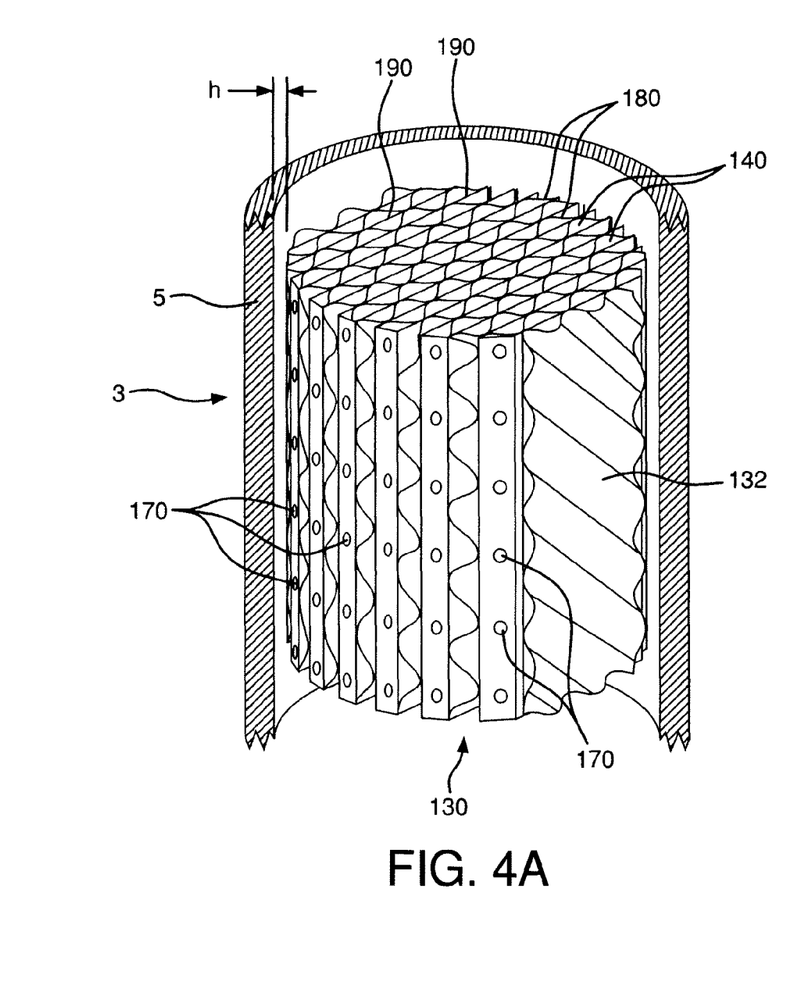
FIGS. 4A and 4B schematically illustrate a portion of a tubular reactor with an insert comprising a structured packing for creating jet impingement on the tube wall.
Figure 4B:
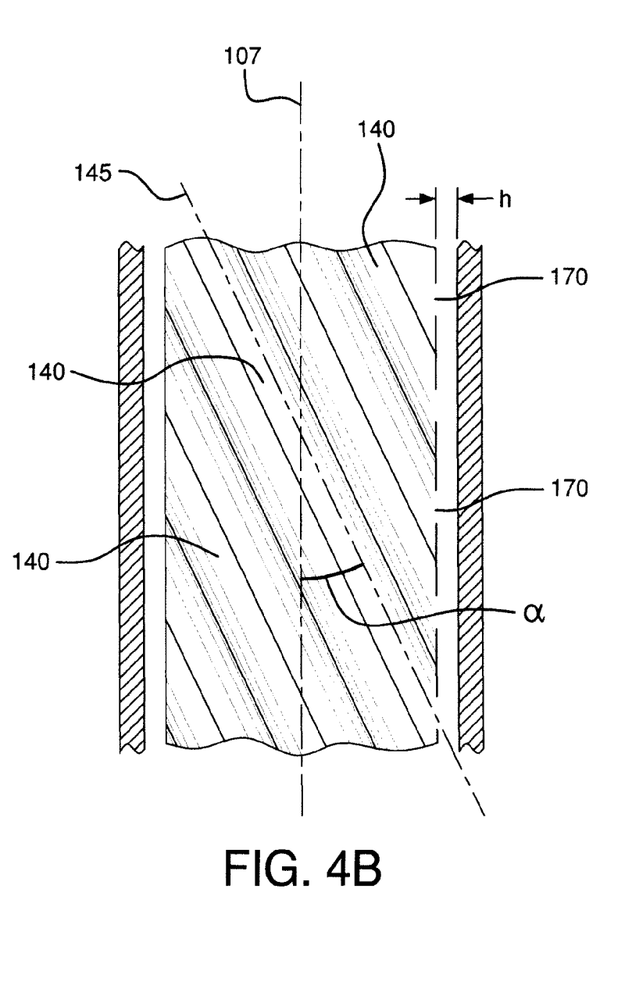

The insert 30 may have a variety of geometries as shown in FIGS. 2-4. The insert 30 has a plurality of orifices 70 for forming fluid jets 71. As used herein, an orifice is an opening (such as a hole) through which something may pass. Orifices may be circular holes or may have other desired shapes such as slits or slots. As used herein, plurality means two or more.

The method comprises introducing a reactant mixture 40 comprising one or more reactants into the tubular reactor inlet 10 with an inlet superficial axial velocity, $v_s$, and at a first pressure, $P_1$.

The reactant mixture may be gaseous or it may be a liquid. For the case of synthesis gas and/or hydrogen production, the one or more reactants may comprise $CH_4$ and $H_2O$. Methane may be provided from natural gas, which comprises primarily methane with minor impurities in the form of ethane, propane and butane.

The superficial axial velocity, is the volumetric flow rate divided by the cross-sectional area of the tube (without considering the area occupied by the insert). The volumetric flow rate corresponds to the volumetric flow rate at the inlet conditions (pressure and temperature). The inlet of the reactor corresponds to the most upstream location where the tube contains the insert (excluding any spacers or connecting rods or support rods) within its cross-section. The first pressure, $P_1$, is the pressure at the inlet to the reactor.

The method further comprises contacting the one or more reactants from the reactant mixture 40 with the catalyst on a first portion of the insert 30 to react the one or more reactants under reaction conditions effective to form a first intermediate mixture comprising the one or more reactants and one or more products. Only a portion of the reactants are converted in the first portion of the insert 30. The first intermediate mixture may be gaseous or liquid. For the case of producing hydrogen and/or synthesis gas, the one or more products include $H_2$ and CO. Suitable reaction conditions for desired reactions are known in the art. For example, for the case of hydrogen and/or synthesis gas production, reaction conditions effective to form the first intermediate mixture may include a temperature ranging from 400° C. to 1000° C. and a pressure ranging from 100 kPa to 4200 kPa.

The method further comprises forming a first plurality of fluid jets 71 with at least a portion of the first intermediate mixture. The first plurality of fluid jets 71 are formed by passing the first intermediate mixture through a plurality of orifices 70 in the first portion of the insert. The orifices direct the fluid jets toward the tube wall 5.

The plurality of orifices are characterized by a hydraulic diameter, d, and a spacing, h, from the tube wall, wherein h/d for the plurality of orifices ranges from 0.5 to 10 or from 1 to 10. For the purposes of this disclosure, the spacing, h, is the distance between the geometric center of the orifice and a point on the tube wall closest to the geometric center of the orifice. The hydraulic diameter is defined in the conventional way, $$d = \frac{4 \times \text{cross-sectional area}}{\text{wetted perimeter}}.$$

The spacing, h, and the hydraulic diameter, d, are parameters, not specific values. The values for the spacing, h, and the hydraulic diameter, d, need not be the same for each of the plurality of orifices. The values may be purposefully varied from insert portion to insert portion or even within an insert portion. The spacing, h, may range from 0.5 mm to 10 mm.

A particular benefit of the present method is that heat transfer is not degraded due to the tube wall creeping after extended operation. Heat transfer is degraded in previous methods that rely on squeezing of the fluid between the insert and the tube wall because when the tube wall diameter increases, the gap between the insert and the tube wall increases resulting in a lower velocity of the fluid. The lower velocity results in decreased heat transfer.

By contrast, the present method purposefully does not rely on the gap between the insert and the tube wall to provide efficient heat transfer, but rather the jet velocity. Since the hydraulic diameter of the orifices does not change after extended operation of the tubular reactor, the velocity of the fluid does not change for a given flow rate, and heat transfer efficiency is maintained.

The method further comprises impinging the first plurality of fluid jets on the tube wall thereby transferring heat between the tube and the first intermediate mixture from the first plurality of fluid jets. Jet impingement enhances heat transfer between the tube wall and the first intermediate mixture by diminishing the boundary layer that would otherwise build up along the tube wall. The jets may be directed substantially perpendicular to the tube wall surface or at an angle to the tube wall. The angle may be within of ±45° of the normal to the tube wall. Heat is transferred between the tube and the first intermediate mixture meaning that heat may be transferred from the tube to the first intermediate mixture or from the first intermediate mixture to the tube.

The method further comprises diverting or passing at least a portion of the first intermediate mixture from the first plurality of fluid jets away from the tube wall thereby forming a return fluid comprising the one or more reactants and the one or more products. After the first intermediate mixture impinges on the tube wall as a fluid jet, it moves away from the tube wall. Movement away from the tube wall may be assisted by the shape of the insert, for example passing the fluid through hollows between rows of orifices. A return fluid is formed from at least a portion of the first intermediate mixture. Catalyst may be present on the tube wall and the one or more reactants may be further converted. It would be desirable to form the return fluid from all of the first intermediate mixture, however some of the first intermediate mixture may bypass the return fluid path.

The method further comprises contacting the one or more reactants from the return fluid with the catalyst on a second portion of the insert 30 to react the one or more reactants under reaction conditions effective to form a second intermediate mixture comprising the one or more reactants and the one or more products. Only a portion of the reactants are converted in the second portion of the insert 30. The second intermediate mixture may be gaseous or liquid. For the case of producing hydrogen and/or synthesis gas, the one or more products include $H_2$ and CO. Like the reaction in the first portion of the insert, suitable reaction conditions for desired reactions are known in the art. For example, for the case of hydrogen and/or synthesis gas production, reaction conditions effective to form the second intermediate mixture may include a temperature ranging from 400° C. to 1000° C. and a pressure ranging from 100 kPa to 4200 kPa. The second intermediate mixture will have a greater concentration of the one or more products than the first intermediate mixture.

The method further comprises forming a second plurality of fluid jets 72 with at least a portion of the second intermediate mixture. The second plurality of fluid jets 72 are formed by passing the second intermediate mixture through a plurality of orifices in the second portion of the insert. The second plurality of fluid jets are located downstream of the first plurality of fluid jets. The orifices direct the fluid jets toward the tube wall 5.

The method further comprises impinging the second plurality of fluid jets on the tube wall 5 thereby transferring heat between the tube and the second intermediate mixture from the second plurality of fluid jets. Jet impingement enhances heat transfer between the tube wall and the second intermediate mixture by diminishing the boundary layer that would otherwise build up along the tube wall. The second plurality of fluid jets may be directed substantially perpendicular to the tube wall surface or at an angle to the tube wall.

The method further comprises diverting or passing at least a portion of the second intermediate mixture from the second plurality of fluid jets away from the tube wall. After the second intermediate mixture impinges on the tube wall as a fluid jet, it moves away from the tube wall.

The sequence of (i) contacting the one or more reactants with the catalyst in a portion of the insert to react the one or more reactants, (ii) forming a plurality of fluid jets, (iii) impinging the fluid jets on the tube wall and returning the fluid for further reaction in another portion of the insert may be repeated multiple times as the reactants are passed from the tubular reactor inlet to the tubular reactor outlet.

The method further comprises withdrawing the product mixture 50 comprising the one or more products from the tubular reactor outlet 20 at a second pressure, $P_2$. The second pressure, $P_2$, is the pressure at the outlet to the reactor. The outlet of the reactor corresponds to the most downstream location where the tube contains the insert (excluding any spacers or connecting rods or support rods) within its cross-section. The product mixture may be gaseous or liquid.

The method is characterized by a cumulative pressure drop in the tubular reactor, $\Delta P_{jet}$, that results from flow through the plurality of orifices, wherein $$\frac{\Delta P_{jet}}{(P_1 - P_2)}$$

is greater than or equal to 0.5.

$$\frac{\Delta P_{jet}}{(P_1 - P_2)}$$

may be greater than or equal to 0.75 or $$\frac{\Delta P_{jet}}{(P_1 - P_2)}$$

may be greater than or equal to 0.9. The cumulative pressure drop in the tubular reactor, $\Delta P_{jet}$, that results from flow through the plurality of orifices is the total pressure drop in the tubular reactor associated with the flow through the orifices. This total pressure drop in the tubular reactor associated with the flow through the orifices may be determined by flow tests through two or more tubular reactors with the orifices where the pressure restriction associated with the orifices has been removed or greatly reduced. To determine the pressure drop without the orifices, flow tests may be conducted where the hydraulic diameter of the orifices are increased to a point where the pressure drop through the orifices is small relative to other pressure drops in the tubular reactor. One skilled in the art can approximate the cumulative pressure drop in the tubular reactor, $\Delta P_{jet}$, that results from flow through the plurality of orifices using computational fluid dynamics (CFD) modeling, other theoretical calculations or by experimentation.

The pressure drop through the plurality of orifices is a suitable parameter for characterizing the method. The velocity of the fluid jet impacts heat transfer between the fluid and the tube wall. The pressure drop through an orifice depends directly on the velocity through the orifice. Therefore, heat transfer may be characterized by the pressure drop through the plurality of orifices.

In the method, the first plurality of fluid jets may have radial components of velocity ranging from $2 \times v_s$ to $25 \times v_s$ or ranging from $10 \times v_s$ to $25 \times v_s$. Also, the second plurality of fluid jets may have radial components of velocity ranging from $2 \times v_s$ to $25 \times v_s$ or ranging from $10 \times v_s$ to $25 \times v_s$.

Some reaction processes that use tubular reactors are endothermic, for example the steam methane reforming process. Therefore, the method may further comprise externally heating the tube wall such that the transferring of heat between the tube and the first intermediate gas mixture is from the tube to the first intermediate gas mixture. External heating of the tube wall may be provided via a combustion reaction, electric heating or other heat sources.

The method may further comprise combusting a fuel external to the tube wall in a combustion reaction, and transferring heat from the combustion reaction to the tube wall such that the transferring of heat between the tube and the first intermediate mixture is from the tube to the first intermediate mixture.

The method may further comprise providing a tubular reactor, the tubular reactor comprising a tube having a tube wall, the tubular reactor having a tubular reactor inlet, and a tubular reactor outlet downstream of the tubular reactor inlet, and wherein the tubular reactor has an insert comprising a catalyst, the insert situated within the tube and wherein the insert has a plurality of orifices for forming fluid jets, the plurality of orifices characterized by a hydraulic diameter, d, and a spacing, h, from the tube wall wherein h/d for the plurality of orifices ranges from 0.5 to 10 or ranges from 1 to 10.

Some reaction processes that use tubular reactors are exothermic, for example water gas shift, methanation, partial oxidation and hydrogenation. The method may further comprise externally cooling the tube wall such that the transferring of heat between the tube and the first intermediate gas mixture is from the first intermediate gas mixture to the tube. Cooling of the tube may be provided by any conventional means, for example, heat transfer to a cooling fluid, or vaporization of a liquid (for example, water) at the exterior of the tube.

FIG. 2 illustrates an embodiment of a tubular reactor suitable for performing the method. A section of the tubular reactor is shown in FIG. 2.

The tubular reactor has a tubular reactor inlet and a tubular reactor outlet downstream of the tubular reactor inlet as illustrated in FIG. 1. With reference to FIG. 2, the tubular reactor comprises a tube 3 having a tube wall 5 and an insert 30 situated within the tube 3. The insert 30 comprises a catalyst and a plurality of metal structures 32.

The tube 3 may be fabricated from any material suitable for the desired application. Suitable materials for tubular reactors for hydrogen and/or syngas production are known in the art.

The plurality of metal structures may be fabricated by conventional metal working methods. Suitable materials of construction may be selected for the particular application. Suitable materials of construction for hydrogen and/or syngas production are known in the art.

The plurality of metal structures 32 are consecutively arranged in a lengthwise direction of the tube. Each of the plurality of metal structures 32 have an upstream end 34, a downstream end 36 and a side wall 38 enclosing a central space between the upstream end 34 and the downstream end 36. The upstream end defines an inlet 42 to the central space. The central space is at least partially blocked at the downstream end 36. The central space may be completely blocked or closed at the downstream end 36.

The side wall is substantially rigid, meaning that the side wall does not expand or contract by greater than 0.05 mm due to pressure differences. The side wall may expand or contract due to thermal expansion.

The side wall 38 has a plurality of orifices 70 which are suitable for forming jets of a fluid directed from the central space toward the tube wall 5. In FIG. 2, the orifices 70 are shown as slots. Alternatively, the orifices could be circular holes. The orifices may have any desired shape. The plurality of orifices 70 are characterized by a hydraulic diameter, d, and a spacing, h, from the tube wall, wherein h/d for the plurality of orifices 70 is in a range of 0.5 to 10 or a range of 1 to 10. The spacing, h, may range from 0.5 mm to 10 mm. The spacing of the insert from the tube wall may be maintained by a spacer or centering pins or other suitable means.

Each of the plurality of metal structures defines an outer space 44 between the side wall 38 of each of the plurality of metal structures 32 and the tube wall 5. Each of the plurality of metal structures 32 has its respective outer space 44. The outer space 44 is in fluid flow communication with the inlet 42 of an adjacent downstream metal structure of the plurality of metal structures 32 or, in the case of the most downstream metal structure, the tubular reactor outlet.

The outer space 44 is for collecting the fluid after it impinges on the tube wall 5 and passing the fluid to the inlet 42 of an adjacent downstream metal structure 32. An outer space in fluid flow communication with the inlet of an adjacent downstream metal structure, means that at least a portion of a fluid flowing through the outer space passes into the inlet of the adjacent downstream metal structure. The outer space 44 for the metal structure furthest downstream will be in fluid flow communication with and thereby pass fluid to the tubular reactor outlet.

Adjacent means nearby and may or may not include contact but does require absence of anything of the same kind in between.

There may be a volume/space between the downstream end 36 of a metal structure and the upstream end 34 of the adjacent downstream metal structure. The distance between adjacent metal structures may be from 0.1 to 1 tube diameters. Where the tube is non-circular, the hydraulic diameter is used to determine the distance. The distance may be 0.5 cm to 50 cm.

The side wall of each of the plurality of metal structures may have a shape complementary to the cross section of the tube. The side wall of each of the plurality of metal structures may be in the shape of a circular cylinder.

The side wall of each of the plurality of metal structures may define a plurality of hollows 46 in the outer space 44. A hollow is a space or cavity in a depressed or low part of a surface, like a valley.

The hollows may be v-shaped, u-shaped, sinusoid-shaped or any other desired shape. In FIG. 2, the hollows 46 are shown as v-shaped hollows.

A plurality of hollows in the outer space improves the flow characteristics of the jets formed by the plurality of orifices by providing space for return flow of the fluid after it impinges on the tube wall. The plurality of hollows also provide a passage for the fluid to move toward the inlet of the adjacent downstream metal structure and/or the tubular reactor outlet.

The catalyst may be supported on the plurality of metal structures. The catalyst may be supported on the metal structure by any means, for example coating, impregnating or otherwise affixing the catalyst to at least a portion of the metal structure.

The catalyst may be supported on catalyst pellets (not shown). The catalyst pellets may be located in the central space of each of the plurality of metal structures.

The catalyst may be supported on a metal substructure (not shown), for example a so-called structured packing. The metal substructure may be situated within the central space of the metal structure of the plurality of metal structures. The metal substructure may be physically attached to or part of the metal structure or may be unattached and setting in metal structure.

The catalyst may be a steam reforming catalyst.

It may be desirable to provide sufficient flow area in the region of the outer space both to minimize interactions between adjacent fluid jets and to minimize the pressure drop in this region. The tube may be characterized by a cross-sectional area, $A_t$, and the outer space including the hollows for each of the plurality of metal structures may be characterized by a cross-sectional area, $A_a$. The cross-sectional area, $A_a$, is the cumulative area for all of the hollows for a cross section. For each of the plurality of metal structures, $$\frac{A_a}{A_t}$$

may range from 0.1 to 0.7 at any position between the upstream end and the downstream end of the metal structure. The cross-sectional area of the tube and the cross-sectional area for the outer space are defined on a plane perpendicular to the tube axis and at the same lengthwise position. The cross-sectional area of the tube, $A_t$, may range from 1 cm² to 1 m² or from 1 cm² to 500 cm².

By contrast, the orifices are expected to provide a significant portion of the pressure drop through the tubular reactor. Consequently, the cumulative flow area, $A_o$, for the plurality of orifices for each of the plurality of metal structures may be 1% to 25% of $A_t$.

The area of an orifice is defined herein as the projected area of the orifice on a planar surface passing through the geometric center of the orifice, where the planar surface is perpendicular to a virtual line defined by a point corresponding to the geometric center of the orifice and a point on the tube wall closest to the point corresponding to the geometric center of the orifice.

Each of the plurality of metal structures 32 may comprise a baffle 60 at the upstream end 34 of the metal structure 32. The baffle may circumscribe the inlet 42 as shown in FIG. 2. A baffle is any device, such as a plate, wall, or screen, that deflects the flow of a fluid.

The baffle may be characterized by a gap which defines a gap area, $A_b$, between the baffle 60 and tube wall 5 wherein $A_b$ is greater than or equal to 1% of the tube cross-sectional area $A_t$ up to about 15% of the tube cross-sectional area $A_t$.

The downstream end of a metal structure may be spaced a distance, D, from the upstream end of the adjacent downstream metal structure where D ranges from 0.5 cm to 50 cm. The spacing may be provided by a spacer (not shown in FIG. 2) or each of the plurality of metal structures may be attached to a central rod (not shown in FIG. 2) connected to each of the plurality of metal structures and running the length of the tube.

FIG. 3 illustrates another geometry for the previous embodiment. The tubular reactor comprises a tube 3 having a tube wall 5 and an insert 30.

The insert comprises a catalyst and a plurality of metal structures 32 consecutively arranged in a lengthwise direction of the tube 3. Each of the plurality of metal structures 32 has an upstream end 34, a downstream end 36 and a side wall 38 enclosing a central space between the upstream end 34 and the downstream end 36. The upstream end 34 defines an inlet 42 to the central space. The central space is at least partially blocked at the downstream end 36. The side wall 38 has a plurality of orifices 70 suitable for forming jets of a fluid directed from the central space toward the tube wall 5. The plurality of orifices 70 are characterized by a hydraulic diameter, d, and a spacing, h, from the tube wall 5, wherein h/d for the plurality of orifices 70 is in a range of 0.5 to 10 or a range of 1 to 10. Each of the plurality of metal structures 32 define an outer space 44 between the side wall 38 of each of the plurality of metal structures 32 and the tube wall 5 wherein the side wall 38 of each of the plurality of metal structures 32 defines a plurality of hollows 46 in the outer space 44. The outer space 44 is in fluid flow communication with the inlet 42 of an adjacent downstream metal structure 32 and/or the tubular reactor outlet.

The metal structure shown in FIG. 3 can be fabricated from metal sheet that is pleated (folded) and then formed into a cylindrical shape, herein termed a "pleated cylinder." The height of the pleats may be in the range of 5% to 40% of the outside diameter of the pleated cylinder. The outside edges of the pleats have orifices that are spaced intermittently along the lengthwise direction of the pleats. For fabrication the outside folds can be cut for a short distance, approximately 50% to 200% of the height of the pleats, at the upstream end of the pleated cylinder, thereby forming loose flaps, and the ends of the flaps can be joined together in pairs. For illustration, the flaps may be numbered sequentially from 1 to N, around the circumference of the pleated cylinder. Flap 2 is joined to flap 3, flap 4 is joined to flap 5, flap 6 is joined to flap 7, continuing until flap N is joined to flap 1. The inner edge of the pleated cylinder between the edge adjacent to flap 1 and the edge adjacent to flap N are also joined.

The open center at the downstream end may be blocked by another flat sheet being suitably shaped complementary to the plurality of hollows to avoid blocking the fluid flow communication between the outer space and the inlet to the adjacent downstream metal structure and/or tubular reactor outlet.

When placed in the tube, axial flow passages are formed between the outside surface of the pleated cylinder and the inside surface of the tube wall. The upstream ends of these passages are essentially blocked by the flaps that have been joined together at the upstream end of the passages. At the downstream end of the passages, the passages are open.

The thickness of the metal sheet used to form the metal structure may be selected so the structure is substantially rigid. Other features may be as described above for the geometry corresponding to FIG. 2.

FIGS. 4A and 4B illustrate another embodiment of a tubular reactor suitable for performing the method. A section of the tubular reactor is shown in FIGS. 4A and 4B.

The tubular reactor has a tubular reactor inlet and a tubular reactor outlet downstream of the tubular reactor inlet as shown in the general drawing in FIG. 1. With reference to FIGS. 4A and 4B, the tubular reactor comprises a tube 3 and an insert 130 situated within the tube 3. The tube has a tube wall 5 and a longitudinal axis 107. The insert 130 comprises a catalyst and a metal structure 132. The catalyst may be a steam reforming catalyst. The steam reforming catalyst may be any catalyst in the art known to be suitable for steam methane (steam hydrocarbon) reforming. The catalyst may be supported on the metal structure 132. The catalyst may be supported on the metal structure by any means, for example coating, impregnating or otherwise affixing the catalyst to at least a portion of the metal structure 132.

The metal structure 132 defines a plurality of substantially parallel passages 140. A plurality of substantially parallel passages means a plurality of passages that are parallel to within 3°. The plurality of substantially parallel passages 140 each have a longitudinal axis 145 which forms an acute angle, α, to a virtual line parallel to the longitudinal axis 107 of the tube. The longitudinal axes of the substantially parallel passages 140 are generally not in the same plane as the longitudinal axis 107 of the tube. Therefore a virtual line that is parallel to the longitudinal axis 107 of the tube needs to be established to determine the acute angle, α. An acute angle is an angle measuring less than 90 degrees.

The acute angle, α, ranges from 10° to 80° or may range from 30° to 60°.

Metal structures defining a plurality of substantially parallel passages, the plurality of substantially parallel passages each having a longitudinal axis formed at an acute angle, α, to a virtual line parallel to the longitudinal axis of the tube are known in the art and represent a type of structured packing. The metal structure may be formed from corrugated metal sheets and flat metal sheets. The metal structure may be made of expanded metal or woven wire screen stacked in layers or a spiral windings.

The key difference between the known structured packing and this embodiment is the orifice feature.

The substantially parallel passages 140 have an upstream end having a cross-sectional area, $A_{inlet}$, and a downstream end terminating in an orifice 170 having a cross-sectional area, $A_{orifice}$, wherein $$\frac{A_{orifice}}{A_{inlet}}$$

for the plurality of substantially parallel passages ranges from 0.001 to 0.7 or ranges from 0.001 to 0.25. $A_{orifice}$ may range from 0.1 mm² to 50 mm² or may range from 0.1 mm² to 20 mm².

The orifice 170 for each of the plurality of substantially parallel passages is characterized by a hydraulic diameter, d, and a spacing, h, from the tube wall, wherein h/d ranges from 0.5 to 10 or from 1 to 10. Like the previous embodiment, the spacing, h, is the distance between the geometric center of the orifice and a point on the tube wall closest to the geometric center of the orifice. The hydraulic diameter is defined as before.

The metal structure including the orifices at the downstream end of the substantially parallel passages may be formed using corrugated metal sheets 180 and folded flat metal sheets 190.

Although shown as holes in FIG. 4A, the orifices may be circular holes, slots, slits, or other desired shape. The substantially parallel passages 140 may terminate in one or more orifices having the same or different cross-sectional areas. In case there are multiple orifices at the downstream of one of the substantially parallel passages, $A_{orifice}$ corresponds to the cumulative area for the multiple orifices.

Two or more orifices may be formed from a cutout overlaying two or more adjacent parallel passages. The area of the orifice for a specific passage is the area of the cutout projected on the downstream cross-section of the passage in the direction of the longitudinal axis of the passage.

The spacing, h, for the orifice of each of the plurality of substantially parallel passages 140 may range from 0.5 mm to 10 mm or may range from 1 mm to 10 mm.

EXAMPLE

The technical effect of the plurality of orifices for jet impingement heat transfer was investigated using Computational Fluid Dynamics (CFD) modeling.

CFD modeling was validated against heat transfer experiments.

Heat transfer experiments were carried out for various packings. The heat transfer coefficient was measured as a function of the pressure drop through the tube. The experiments were conducted using air as the fluid and the tube was electrically heated. The experiments were conducted at roughly atmospheric pressure and ambient temperature. The heat transfer coefficient was calculated from wall temperature measurements for various flow rates.

Figure 5:
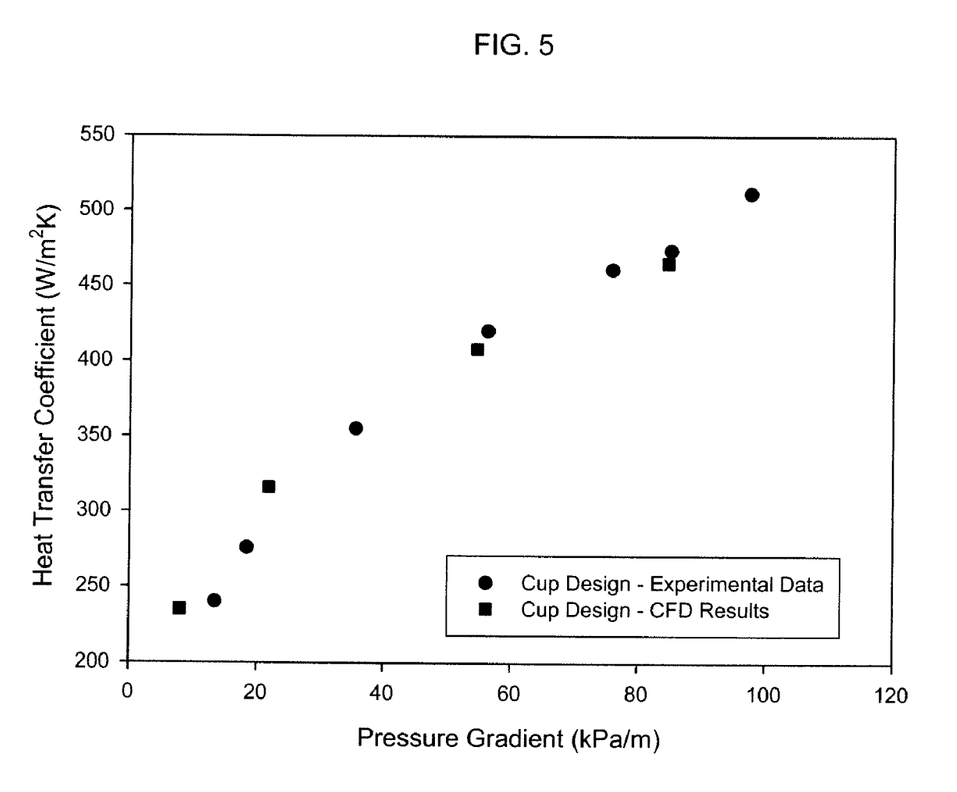
FIG. 5 is a plot of heat transfer coefficient versus pressure gradient through a tubular reactor comparing experimental data and computational fluid dynamics simulation results.

The results of CFD simulations are compared to experimental data in FIG. 5. for the "cup design," similar to the structure illustrated in FIG. 2. In the "cup design," the spacing between the orifice opening and the tube wall is about 3 mm. The metal structure had a length of about 66 mm, with a 18 mm distance between adjacent metal structures. The metal structure had an open top and a sealed bottom. The diameter of the side wall was about 86 mm. The side wall had a total of 28 slits, each with a width of about 1 mm. The upstream end of the metal structures each had a baffle to block the flow passage between the metal structure wall and the tube wall.

Figure 6:
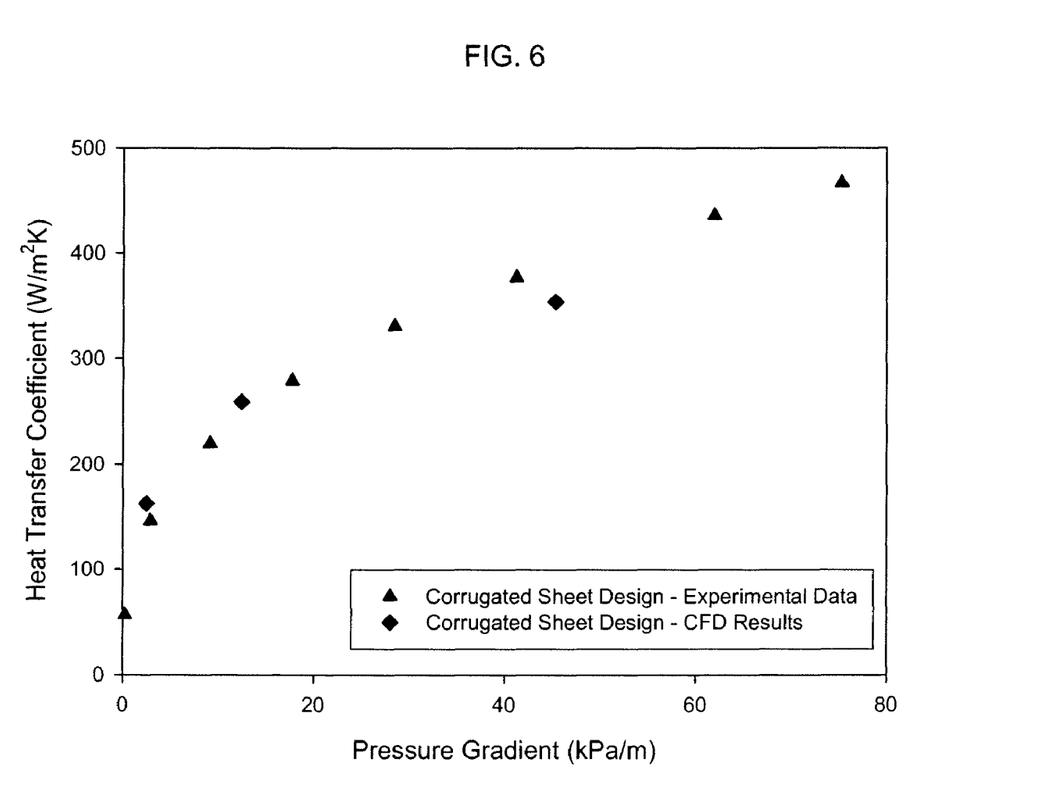
FIG. 6 is a plot of heat transfer coefficient versus pressure gradient through a tubular reactor comparing experimental data and computational fluid dynamics simulation results.

The results of CFD simulations are compared to experimental data in FIG. 6 for a conventional "corrugated sheet design," which is similar to the structure illustrated in FIG. 4, but without the plurality of orifices of the present invention. Each metal structure consisted of 30 corrugated and 31 flat sheets of 0.2 mm aluminum foil. The metal structures were cut to a rectangular shape of 101 mm length and varying width, such that, when stacked with corrugated and flat sheets alternating, the stack formed a cylindrical shape of 101 mm length and 98 mm diameter. The corrugated and flat sheets define channels whose cross sections resemble isosceles triangles with approximately 3 mm height and 6 mm base. The corrugated sheets are arranged with orientations such that the direction of flow alternates from layer to layer. In the "corrugated sheet design," the angle of the corrugations relative to the tube axis is about 60 degrees and the spacing between the edge of the structure and the tube wall is 1 mm.

The close agreement between the CFD modeling results and the heat transfer experiments indicates suitable reliability of the CFD modeling.

Figure 7:
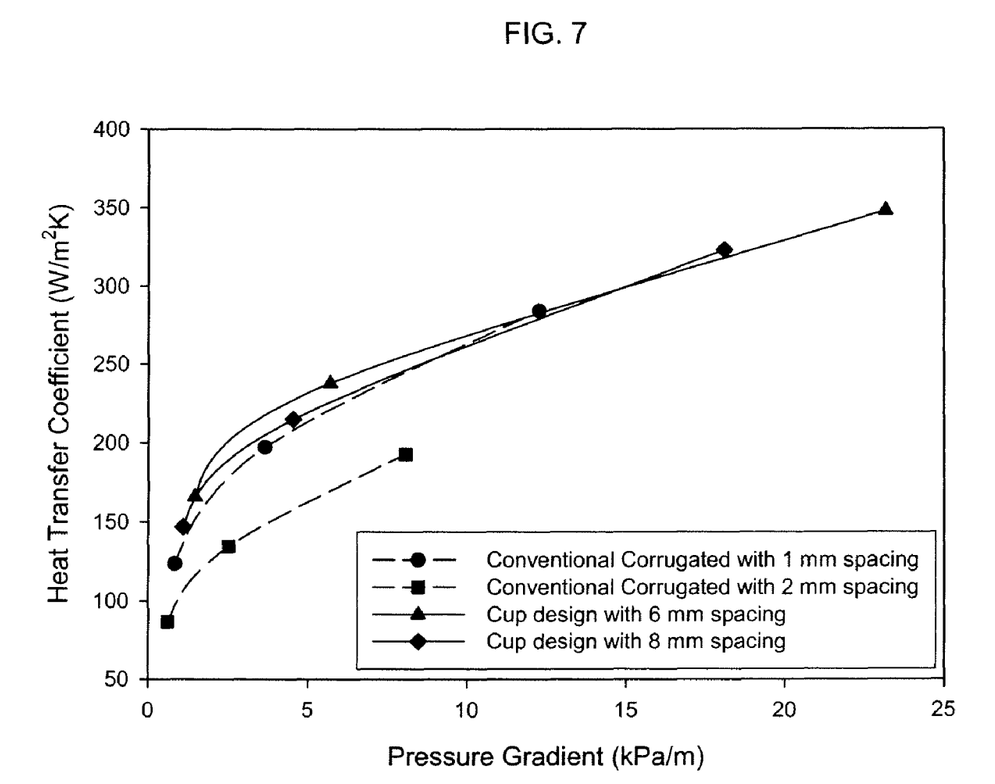
FIG. 7 is a plot of heat transfer coefficient versus pressure gradient through a tubular reactor calculated by computational fluid dynamics simulations comparing a conventional corrugated structured packing and a structured packing according to the present invention.

FIG. 7 shows results of CFD simulations for a conventional "corrugated sheet design" and the "cup design." In the "corrugated sheet design," the angle of the corrugations relative to the tube axis is about 45 degrees.

In FIG. 7, results are shown for the conventional "corrugated sheet design" having 1 mm spacing between the metal structure and the tube wall and for 2 mm spacing between the metal structure and the tube wall. The increase in spacing represents the condition after the tube creeps. The CFD modeling results show how the heat transfer coefficient is decreased by the increase in the spacing for the conventional corrugated sheet design.

FIG. 7 also shows CFD modeling results for the "cup design." Results are shown for a case where the spacing between the orifice opening and the tube wall is 6 mm, representing initial conditions and also 8 mm distance between the orifice opening and the tube wall, representing 4 mm creep of the tube. The CFD modeling results show how the heat transfer coefficient is substantially unchanged by the change in the distance between the spacing between the orifice and the tube wall for the "cup design." This is in contrast to the conventional "corrugated sheet design" where the heat transfer coefficient is significantly decreased by the increased spacing.

Figure 8:
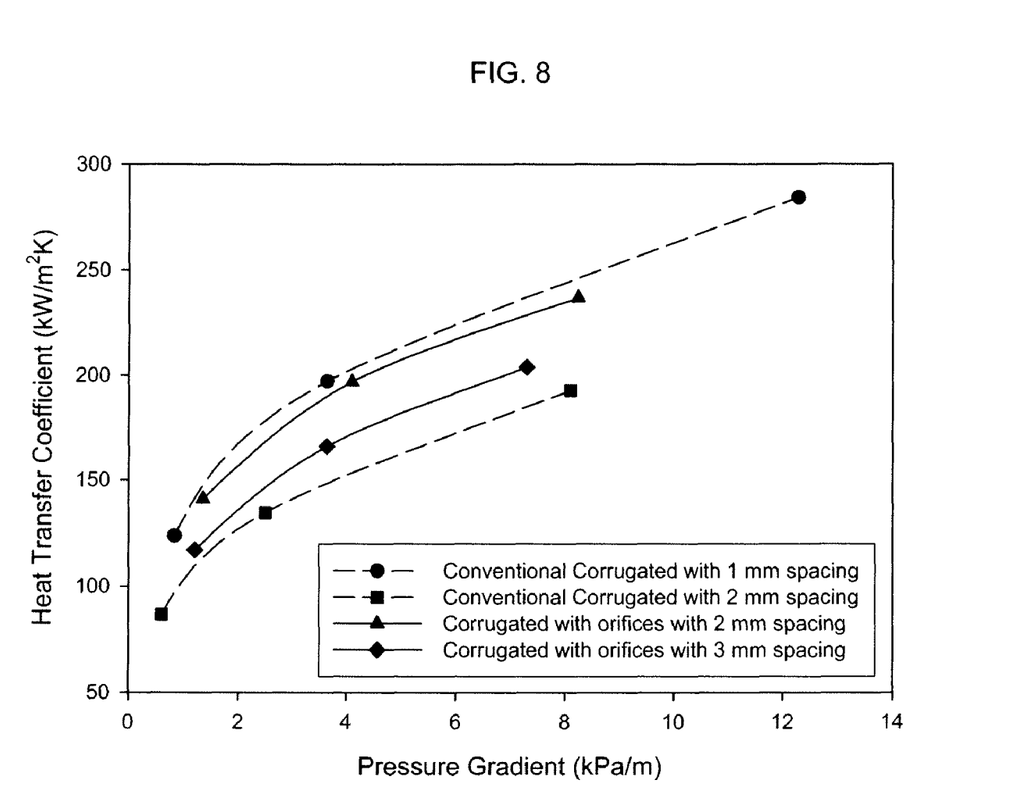
FIG. 8 is a plot of heat transfer coefficient versus pressure gradient through a tubular reactor calculated by computational fluid dynamics simulations comparing a conventional corrugated structured packing and a structured packing according to the present invention.

FIG. 8 shows results of CFD simulations for a conventional "corrugated sheet design" and a "corrugated sheet design" having a plurality of orifices. The conventional "corrugated sheet design" is the same as described for FIG. 7. In the "corrugated sheet design" having a plurality of orifices, the angle of the corrugations relative to the tube axis was about 30 degrees and the area ratio between the slot openings and the flow channel was about 0.5. Results are shown for a case where the spacing between the orifice opening and the tube wall is 2 mm, representing the initial conditions, and also for a spacing of 3 mm, representing a case where the tube has experienced 2 mm creep. The results show how the heat transfer coefficient for the design with the plurality of orifices is not decreased as much as the conventional design when the spacing is increased (i.e. after the tube creeps).

We claim:

1. A method for producing a product mixture in a tubular reactor, the tubular reactor comprising a tube having a tube wall, the tubular reactor having a tubular reactor inlet, and a tubular reactor outlet downstream of the tubular reactor inlet, and wherein the tubular reactor has an insert comprising a catalyst, the insert situated within the tube and wherein the insert has a plurality of orifices for forming fluid jets, the plurality of orifices characterized by a hydraulic diameter, d, and a spacing, h, from the tube wall, wherein h/d for the plurality of orifices ranges from 0.5 to 10, the method comprising:

(a) introducing a reactant mixture comprising one or more reactants into the tubular reactor inlet with an inlet superficial axial velocity, $v_s$, and at a first pressure, $P_1$;

(b) contacting the one or more reactants from the reactant mixture with the catalyst on a first portion of the insert to react the one or more reactants under reaction conditions effective to form a first intermediate mixture comprising the one or more reactants and one or more products;

(c) forming a first plurality of fluid jets with at least a portion of the first intermediate mixture;

(d) impinging the first plurality of fluid jets on the tube wall thereby transferring heat between the tube and the first intermediate mixture from the first plurality of fluid jets;

(e) diverting at least a portion of the first intermediate mixture from the first plurality of fluid jets away from the tube wall thereby forming a return fluid comprising the one or more reactants and the one or more products;

(f) contacting the one or more reactants from the return fluid with the catalyst on a second portion of the insert to react the one or more reactants under reaction conditions effective to form a second intermediate mixture comprising the one or more reactants and the one or more products;

(g) forming a second plurality of fluid jets with at least a portion of the second intermediate mixture, the second plurality of fluid jets located downstream of the first plurality of fluid jets;

(h) impinging the second plurality of fluid jets on the tube wall thereby transferring heat between the tube and the second intermediate mixture;

(i) diverting at least a portion of the second intermediate mixture from the second plurality of fluid jets away from the tube wall; and (j) withdrawing the product mixture comprising the one or more products from the tubular reactor outlet at a second pressure, $P_2$;

wherein a cumulative pressure drop in the tubular reactor, $\Delta P_{jet}$, results from flow through the plurality of orifices; and wherein $$\frac{\Delta P_{jet}}{(P_1 - P_2)} \geq 0.5.$$

wherein the tubular reactor comprises: the tube having the tube wall and a longitudinal axis, and the insert situated within the tube, wherein the insert comprises: the catalyst; and a metal structure defining a plurality of substantially parallel passages, the plurality of substantially parallel passages each having a longitudinal axis formed at an acute angle, α, to a virtual line parallel to the longitudinal axis of the tube, wherein α ranges from 10° to 80°, wherein each of the substantially parallel passages have an upstream end having a cross-sectional area, $A_{inlet}$, and downstream end terminating in an orifice having a cross-sectional area, $A_{orifice}$, wherein $A_{orifice}/A_{inlet}$ for the plurality of substantially parallel passages ranges from 0.001 to 0.7.

2. The method of claim 1 wherein $$\frac{\Delta P_{jet}}{(P_1 - P_2)} \geq 0.75.$$

3. The method of claim 1 wherein the first plurality of fluid jets have radial components of velocity ranging from $2 \times v_s$ to $25 \times v_s$ and the second plurality of fluid jets have radial components of velocity ranging from $2 \times v_s$ to $25 \times v_s$.

4. The method of claim 1 wherein the step of diverting at least a portion of the first intermediate mixture from the first plurality of fluid jets away from the tube wall comprises passing the at least a portion of the first intermediate mixture through a plurality of hollows formed between the tube wall and the insert.

5. The method of claim 1 further comprising:
combusting a fuel external to the tube wall in a combustion reaction; and
transferring heat from the combustion reaction to the tube wall such that the transferring of heat between the tube and the first intermediate mixture is from the tube to the first intermediate mixture.

6. The method of claim 1 wherein the one or more reactants comprise $CH_4$ and $H_2O$ and the one or more products comprise $H_2$ and CO and wherein the catalyst is a steam reforming catalyst.

7. The method of claim 1 wherein the reaction conditions effective to form the first intermediate mixture include a temperature ranging from 400° C. to 1000° C. and a pressure ranging from 100 kPa to 4200 kPa and wherein the reaction conditions effective to form the second intermediate mixture include a temperature ranging from 400° C. to 1000° C. and a pressure ranging from 100 kPa to 4200 kPa.

* * * * *